(12) United States Patent
Schmidt et al.

(10) Patent No.: US 7,207,882 B2
(45) Date of Patent: Apr. 24, 2007

(54) TEXTURED AUGER TROUGH ELEMENT FOR A TAILINGS CONVEYOR OF AN AGRICULTURAL COMBINE

(75) Inventors: James R. Schmidt, Blue Grass, IA (US); Jonathan E. Ricketts, Viola, IL (US); Robert A. Matousek, Milan, IL (US)

(73) Assignee: CNH America LLC, New Holland, PA (US)

( * ) Notice: Subject to any disclaimer, the term of this patent is extended or adjusted under 35 U.S.C. 154(b) by 173 days.

(21) Appl. No.: 10/909,197

(22) Filed: Jul. 30, 2004

(65) Prior Publication Data

US 2006/0025188 A1    Feb. 2, 2006

(51) Int. Cl.
  *A01F 11/06*    (2006.01)
  *A23N 5/00*    (2006.01)
  *B02B 3/00*    (2006.01)

(52) U.S. Cl. .......................................................... 460/46

(58) Field of Classification Search .................. 460/45, 460/46, 58, 71, 75, 107, 108, 109, 110
See application file for complete search history.

(56) References Cited

U.S. PATENT DOCUMENTS

| | | | | |
|---|---|---|---|---|
| 298,196 | A * | 5/1884 | Gates | 460/15 |
| 352,023 | A | 11/1886 | Woodruff | |
| 858,696 | A * | 7/1907 | Anderson | 56/124 |
| 1,282,408 | A | 10/1918 | Gaylord | |
| 2,321,019 | A | 6/1943 | Dray | 130/27 |
| 2,457,680 | A | 12/1948 | Johnson | 460/110 |
| 2,771,077 | A * | 11/1956 | Karlsson et al. | 460/108 |
| 2,875,768 | A * | 3/1959 | Hockey et al. | 460/14 |
| 3,247,855 | A * | 4/1966 | Kepkay | 460/14 |
| 3,297,037 | A * | 1/1967 | Ausherman | 460/107 |
| 3,945,178 | A * | 3/1976 | Delfosse et al. | 56/14.6 |
| 3,976,084 | A * | 8/1976 | Weber | 460/14 |
| 3,983,883 | A * | 10/1976 | Ashton et al. | 460/85 |
| 4,306,572 | A | 12/1981 | Campbell et al. | 130/27 T |
| 4,307,732 | A * | 12/1981 | De Busscher et al. | 460/99 |
| 4,875,891 | A * | 10/1989 | Turner et al. | 460/110 |
| 4,909,772 | A * | 3/1990 | Kuchar | 460/71 |
| 5,024,631 | A * | 6/1991 | Heidjann et al. | 460/75 |
| 5,613,907 | A * | 3/1997 | Harden | 460/109 |
| 5,816,911 | A | 10/1998 | Dwyer | 460/71 |
| 6,106,390 | A | 8/2000 | Doggrell et al. | 460/141 |
| 6,327,970 | B1 | 12/2001 | Kooima et al. | 99/519 |
| 6,485,364 | B1 | 11/2002 | Gryspeerdt et al. | 460/107 |
| 6,537,148 | B2 | 3/2003 | Schwersmann | 460/107 |
| 2003/0032465 | A1 | 2/2003 | Schwersmann et al. | |

* cited by examiner

*Primary Examiner*—Árpád Fábián Kovács
(74) *Attorney, Agent, or Firm*—Michael G. Harms; John William Stader; Stephen A. Bucchianeri

(57) ABSTRACT

A textured trough element including a concave surface having a curved profile when viewed from a longitudinal end thereof of marginally larger diametrical extent than the circular cross section of a helical tailings auger. The trough element is positionable in a bottom portion of an auger trough with the concave surface facing and extending partially around a bottom portion of the helical radial outer periphery of the auger such that the auger will convey the tailings on and along the concave surface. The concave surface has a sufficiently rough surface texture for causing tumbling and rolling of at least a substantial portion of the tailings conveyed thereover, for loosening and releasing at least some of any grain partially or fully contained in elements of the tailings.

37 Claims, 7 Drawing Sheets

TEXTURED AUGER TROUGH ELEMENT FOR A TAILINGS CONVEYOR OF AN AGRICULTURAL COMBINE

TECHNICAL FIELD

This invention relates generally to an agricultural harvesting machine, and more particularly, to a textured trough element positionable in a tailings conveyor of a harvesting machine and which functions in cooperation with a rotary auger of the conveyor for causing grains contained in elements of the tailings to be loosened, removed and/or released therefrom as they are conveyed by the conveyor, and which element can be optionally removable and replaceable with a replacement element having the same or different texture and/or other characteristics.

BACKGROUND ART

Typically, an agricultural harvesting machine such as a combine gathers crop from a field and transports the crop by means of a feeder house to a threshing and separating device located inside the combine. Generally, threshing refers to removing grain, beans, seeds or kernels, hereinafter referred to as just grain, which are desired to be collected, from husks, cobs, pods, stems, hulls and other portions of the plants being harvested, which are to be discarded. The threshing and separating device delivers the crop to the cleaning system of the combine, which includes a plurality of sieves. An upper sieve allows clean grain and some crop material such as pod, husk and cob fragments and hulls still containing grain to fall through it, and a lower sieve is adjusted so that only clean grain is allowed to pass through it. The clean grain and crop material including some grain that falls through the upper sieve, but does not pass through the lower sieve, is called tailings. In some harvests, the tailings can include a significant amount of grain (e.g. beans, seeds or kernels) fully or partially contained, held or retained in partial or full pods, husks, cobs and hulls. For example, when harvesting soybeans, some areas of a field or an entire field may include plants which matured later for a variety of reasons and thus have somewhat green bean pods, which, as a result of their less than full maturity, are not fully opened by the initial threshing operation. As a result, in many cases it is desired or required for this material to be threshed and/or cleaned again.

Prior methods and apparatus for returning the tailings to the threshing and cleaning systems conveyed them to one side of the combine with a rotary helical auger located in a housing or trough. The internal surfaces of the known housings and troughs are smooth, and become polished with use, due to abrasive properties of the tailings and dust which is typically mixed with the tailings. As a result, the tailings move smoothly along the internal surfaces with virtually no actions that would tend to loosen or release grain held in pods, husks, hulls and the like. The tailings are then carried by a conveyor, typically a paddle and chain conveyor, back to the combine threshing mechanism. Some combines have used a rethreshing device which is separate from the threshing system which helps save capacity on the threshing system by rethreshing the tailings separately from new crop coming into the combine. The auger feeds material into the rethreshing device and then the material is conveyed back to the cleaning system. Both single impeller/blowers and augers have been used to convey this material back to the cleaning system. These rethreshing devices are usually convertible, enabling the operator to manipulate the machine to be more or less aggressive, depending on such factors as the amount of unreleased grain contained in the tailings, and vulnerability of the grain to damage during processing.

What is sought is an element for a tailings conveyor which reduces the requirement or need for aggressive rethreshing of tailings and thus the risk of damage to grain resulting therefrom, and which improves the throughput capability and efficiency of a rethreshing system.

SUMMARY OF THE INVENTION

What is disclosed is a textured trough element for a tailings conveyor of an agricultural combine which provides one or more of the capabilities and overcomes one or more of the problems and shortcomings set forth above. The tailings conveyor includes a rotary auger contained or located in a housing or trough and rotatable about an axis therethrough. The auger has a helical radial outer periphery having a circular shape profile when viewed from an axial end thereof. The textured trough element according to the invention includes a concave surface having a curved profile when viewed from a longitudinal end thereof of marginally larger diametrical extent than the circular cross section of the auger. The trough element is positionable in a bottom portion of the trough with the concave surface facing and extending partially around a bottom portion of the helical radial outer periphery of the auger such that the auger will convey the tailings on and along the concave surface. The concave surface has a sufficiently rough surface texture for causing tumbling and rolling of at least a substantial portion of the tailings conveyed thereover, for loosening and releasing at least some of any grain partially or fully contained in elements of the tailings.

As a result, the tailings are effectively at least partially threshed by passage through the conveyor, such less or even no aggressive threshing action is required by subsequent elements of the threshing system.

According to one preferred aspect of the invention, the concave surface of the trough element includes a plurality of upwardly extending elements welded to the surface.

According to another preferred aspect of the invention, the concave surface of the trough element is a sheet having a plurality of spaced, elements extending upwardly therefrom. The sheet can be metal or plastics.

According to another preferred aspect of the invention, the concave surface includes an array of elongate members or ribs having spaces therebetween, the elongate members being parallel and/or intersecting, and the spaces having bottom portions which are enclosed for preventing passage of tailings downwardly therethrough, the spaces being sufficiently large for receiving portions of elements of the tailings as the tailings are conveyed thereover by the auger, and such that at least a substantial portion of the elements of the tailings received in the spaces will roll when conveyed from the spaces over an adjacent one of the ribs.

For instance, the concave surface can include an expanded metal sheet over a solid sheet. The concave surface can alternatively include a layer of upwardly extending grains having randomly facing surfaces and edges which will cause the tailings to tumble and roll when conveyed thereover.

According to still another preferred aspect of the invention, the bottom portion of the trough has an opening therein, and the trough element is configured to enclose the opening. The concave surface can be configured to at least substantially occupy the opening in the bottom portion of the trough and the trough element can include elements such as one or more flanges, or a lip, located adjacent to the concave surface in position to contact a surface of the trough adjacent to the opening, for holding the trough element in the position in the trough with the concave surface located radially outwardly of and extending partially around the bottom portion of the helical radial outer periphery of the auger such that the auger will convey the tailings along the concave surface.

DETAILED DESCRIPTION OF THE INVENTION

Figure 1:
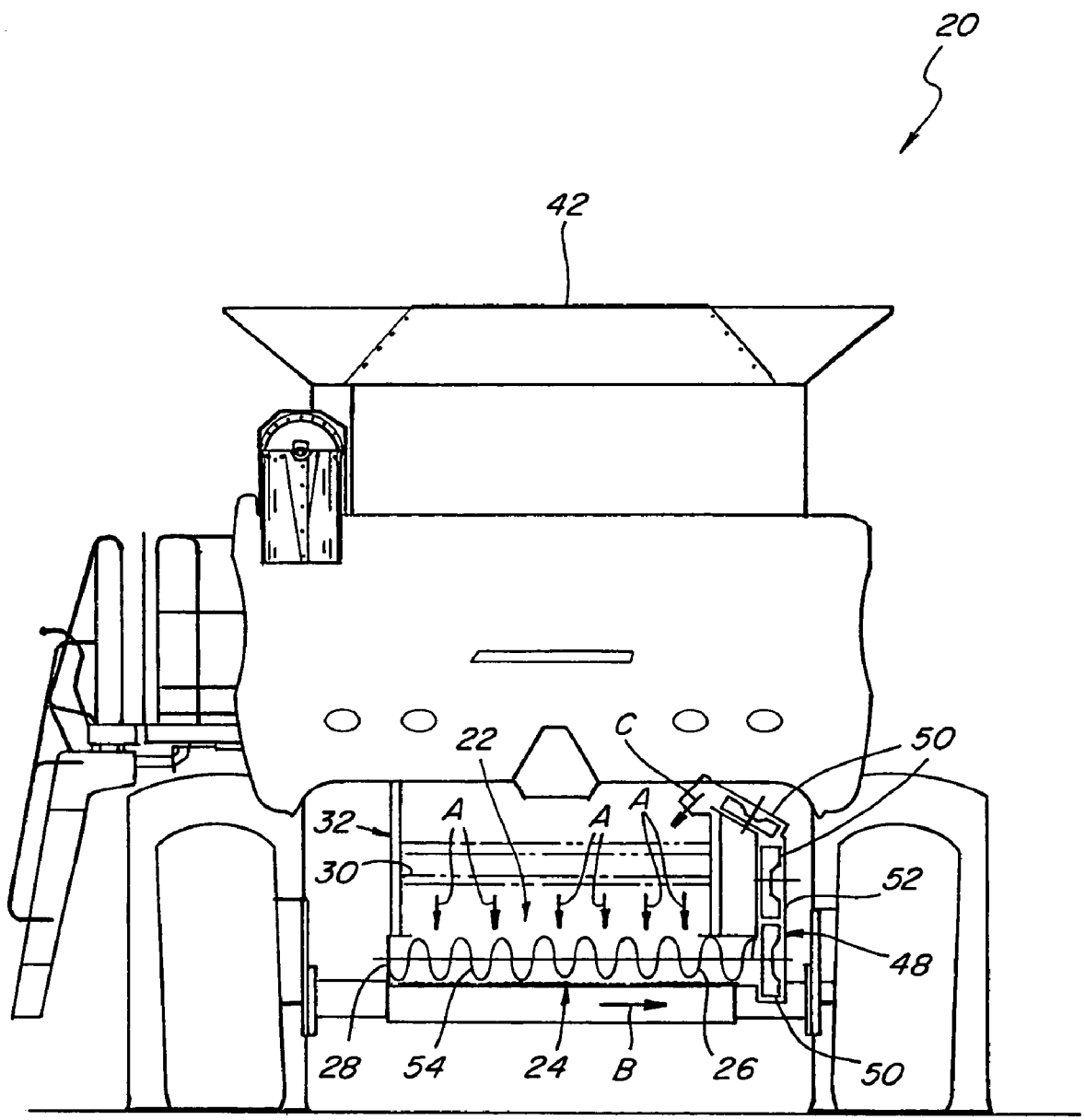
FIG. 1 is a simplified rear end view of an agricultural combine, showing a simplified schematic representation of a tailings conveyor including a textured trough element according to the present invention.
Figure 2:
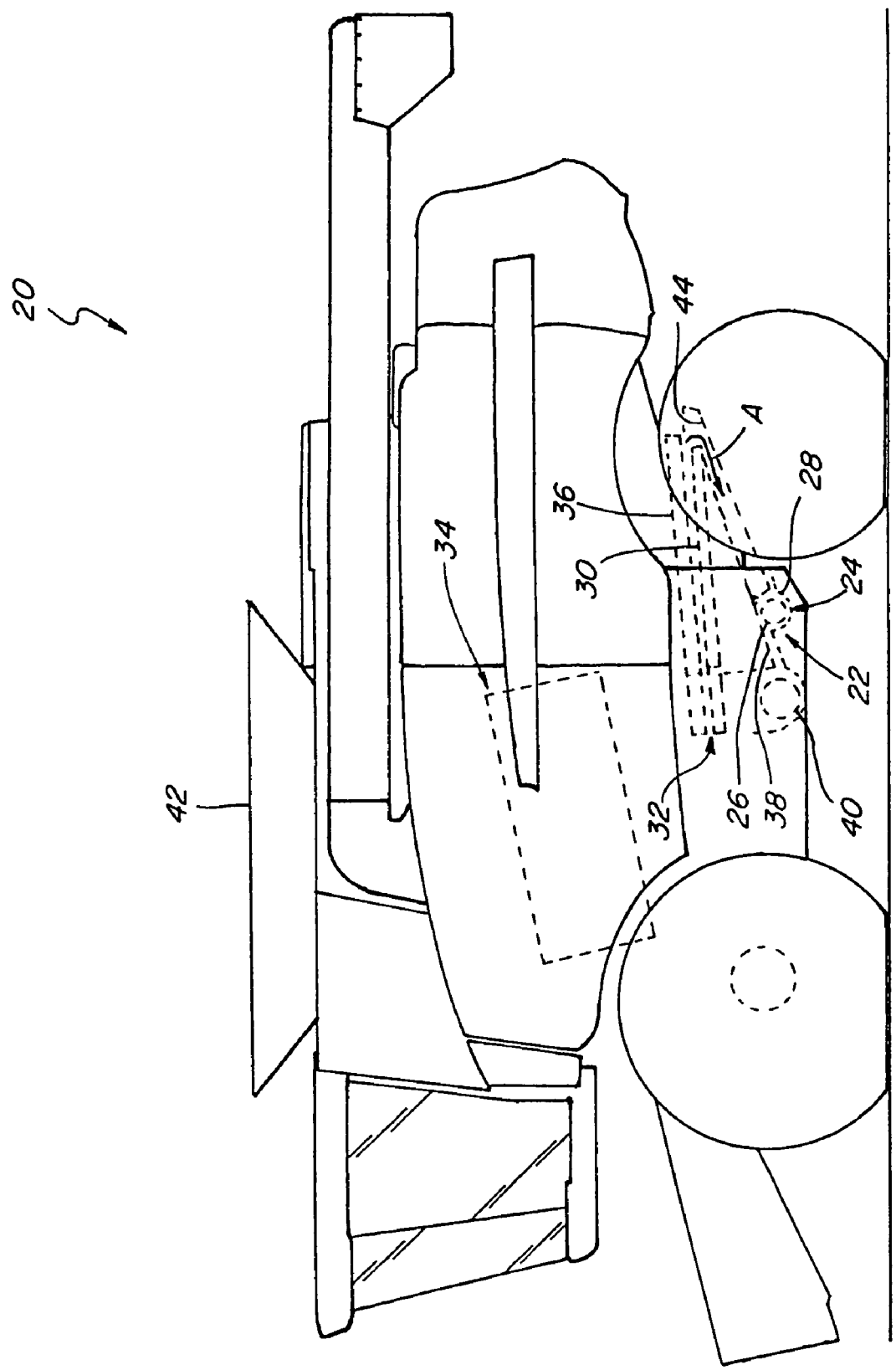
FIG. 2 is a simplified side view of the combine of FIG. 1, illustrating the location of the of the tailings conveyor and the trough element of the invention.

Referring to FIGS. 1 and 2, an agricultural combine 20 including a tailings conveyor 22 having a textured trough element 24 constructed and operable according to the teachings of the present invention is shown. Tailings conveyor 22 includes an elongated rotary helical auger 26 located in an elongate upwardly open trough 28, for receiving a flow of tailings, denoted by arrows A, from a lower sieve 30 of a cleaning system 32 of combine 20, in the conventional, well known manner. Also in the well known matter, combine 20 includes a threshing system 34 which receives crop material from harvesting apparatus (not shown) on the front of combine 20 and threshes at least much of the grain from pods, husks, cobs, hulls or the like containing the grain, the grain and smaller elements of the crop material being transported to cleaning system 32 which includes an upper chaffer sieve 36 for receiving the grain and other material. Upper chaffer sieve 36 and lower sieve 30 each have openings therethrough (not shown) the openings of chaffer sieve 36 being larger than those of lower sieve 30, such that the grain and other smaller elements of the crop material, which can include pod, cob or husk fragments still containing some grain, will pass through chaffer sieve 36 and fall onto lower sieve 30. The smaller openings of lower sieve 30 will allow the clean grain to fall therethrough so as to be transported downwardly along an incline surface 38 to a clean grain auger 40, in the conventional manner. The clean grain is then conveyed by auger 40 to a grain elevator (not shown) to a grain storage area 42.

During operation, both lower sieve 30 and chaffer sieve 36 are vibrated to facilitate the cleaning process. With regard to lower sieve 30, this facilitates larger elements of crop material, that is, the tailings, being carried to the rear end of lower sieve 30 so as to fall onto another inclined surface 44, which will carry the tailings to tailings conveyor 22, again as denoted by arrow A.

Figure 3:
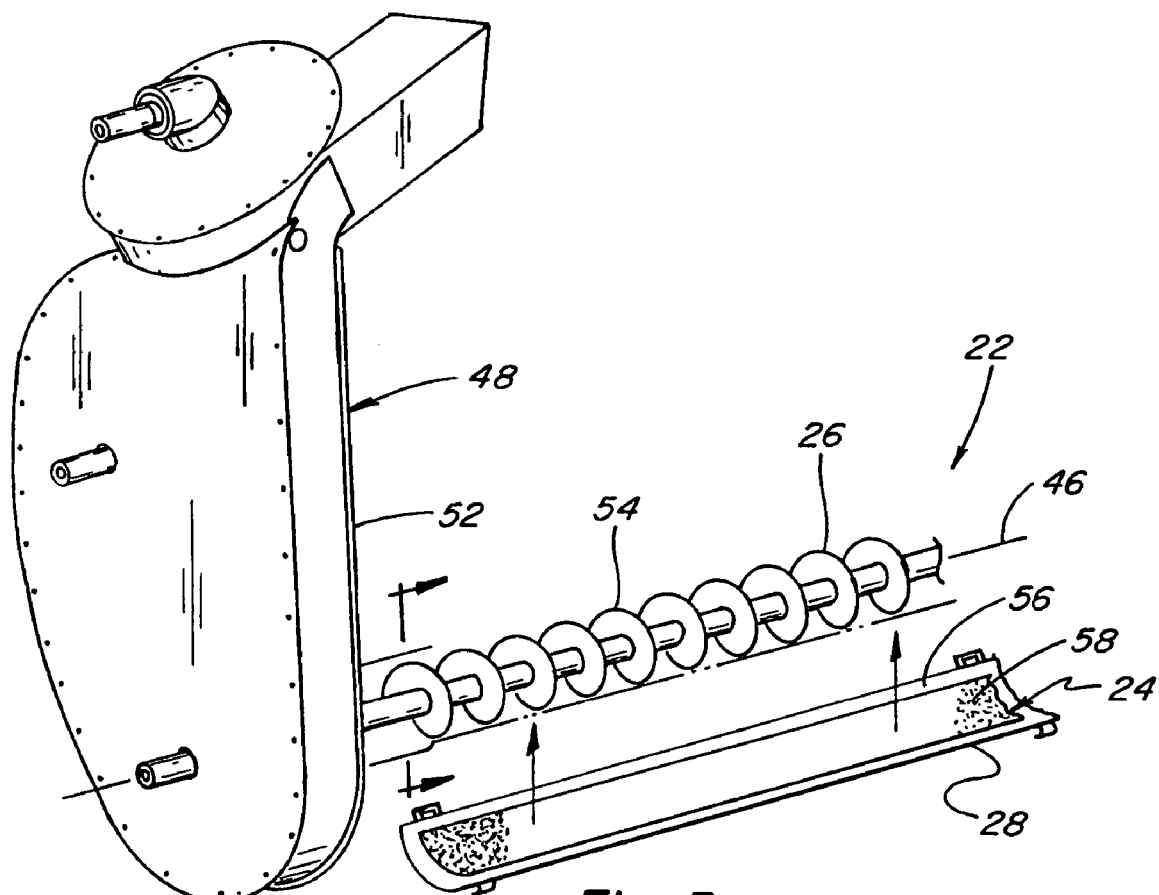
FIG. 3 is a simplified perspective representation of a trough element of the invention in association with a tailings conveyor.
Figure 4:
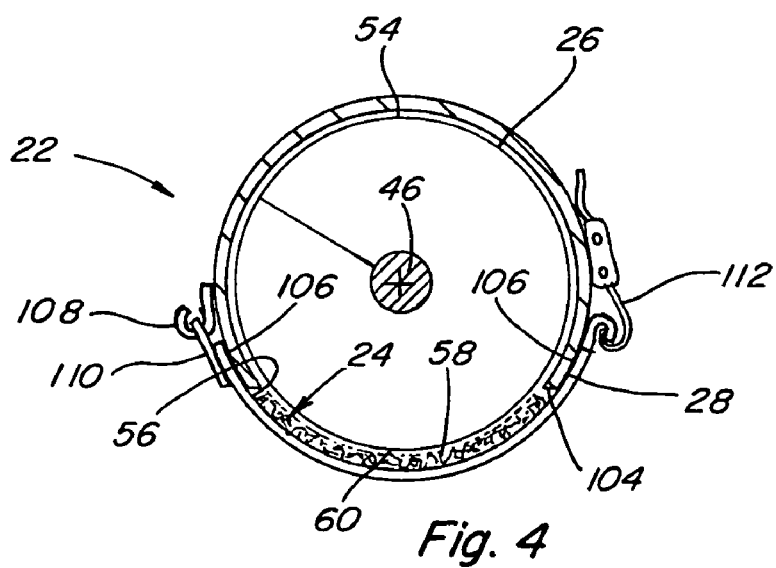
FIG. 4 is a representative sectional view taken through what would be an end of the tailings conveyor of FIG. 3, showing the trough element of the invention installed thereon.

Referring also to FIGS. 3 and 4, auger 26 of tailings conveyor 22 is drivingly rotated about a longitudinally extending rotational axis 46 therethrough by a suitable drive, such as, but not limited to, a belt drive, chain drive, hydraulic motor, electric motor, or the like (not shown) in the well known, conventional matter, for conveying the tailings delivered to conveyor 22, toward the right side of combine 20, as denoted by arrow B in FIG. 1, to a second tailings conveyor 48 which, in turn, will convey the tailings and discharge them back onto upper chaffer sieve 36 of cleaning system 32. For this purpose, second tailings conveyor 48 includes at least one rotary impeller 50, and preferably several, as shown, either jointly or independently rotatable using suitable drives, such as set forth above, for conveying the tailings back onto upper chaffer sieve 36, as denoted by arrow C in FIG. 1. The impellers 50 of conveyor 48 are contained in a housing 52 through which the tailings are conveyed by impeller or impellers 50, it being preferred that impellers 50 have characteristics and be propelled at sufficient rotational velocity, such that the tailings will be at least partially threshed thereby. That is, any grain still held or contained in pod, husk or cob fragments, or other elements of the tailings, will be loosened, released and/or removed therefrom, such that the grain can be successfully separated and cleaned from the other crop material. In this regard, it has been found that causing the deflection of the tailings off of internal surfaces of housing 52, the blades of impeller 50, and causing collisions between the tailings themselves, is highly useful in performing the desired threshing function. It has also been found that by directing the tailings back onto upper chaffer sieve 36 of cleaning system 32, instead of back end to threshing system 34, it is preferable in many instances, as less occurrence of cracking and other undesirable damage to the grain is likely to occur, although it is also possible, and may be desirable in some instances, to direct the tailings instead, or additionally, to threshing system 34.

As noted above, auger 26 has a helical radial outer periphery 54 which circumscribes an arc, or has a circular profile shape when viewed from the axially end of auger, as best shown in FIG. 4. Textured trough element 24 of the invention is an elongate member which is positioned in a bottom region or portion 56 of trough 28, and includes an upwardly facing concave surface 58 having a curved profile shaped when viewed from a longitudinal end thereof of marginally larger diametrical extent than the circular cross-section of radial outer periphery 54 of auger 26. Trough element 28 is positioned such that concave surface 58 will extend partially around a bottom portion 60 of radial outer periphery 54, such that auger 26 will convey the tailings over concave surface 58.

As is explained in more detail hereinafter, concave surface 58 has a sufficiently rough surface texture for causing tumbling and rolling of at least a substantial portion of the tailings conveyed thereover. This is to cause loosening, releasing and/or removing of at least some of any grain partially or fully contained in elements of the tailings such as partial pods, husks, cobs, hulls or the like. A wide variety of materials and elements can be utilized for providing the rough surface texture of concave surface 58 according to the invention, and different surface textures may be more or less appropriate for different crops.

Figure 5A:
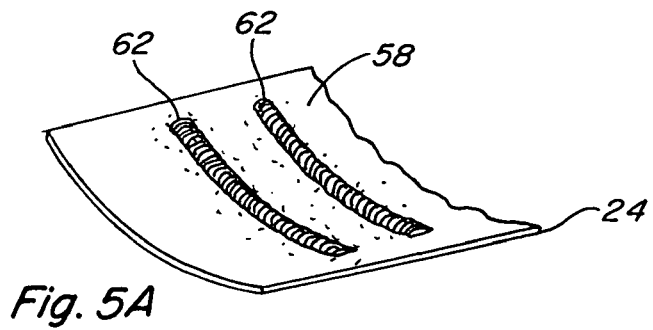
FIG. 5A is a fragmentary perspective representation of a trough element of the invention, including one representative surface texture.

Turning also to FIGS. 5A, 5B, 5C, 5D, 5E and 5F, several exemplary surface textures are shown. In FIG. 5A, a plurality of elongate weld bead 62 are shown on concave surface 58 of trough element 24. Weld beads such as beads 62 shown can extend in spaced relation one relative to the other across surface 58, and/or they can extend longitudinally therealong, and/or extend diagonally, and/or intersect in a criss-cross or other intersecting pattern. Beads 62 can also be straight, curved, or a mixture of both. The height and width of beads 62 can be varied as desired for achieving a desired or required tumbling and rolling of the tailings.

Figure 5B:
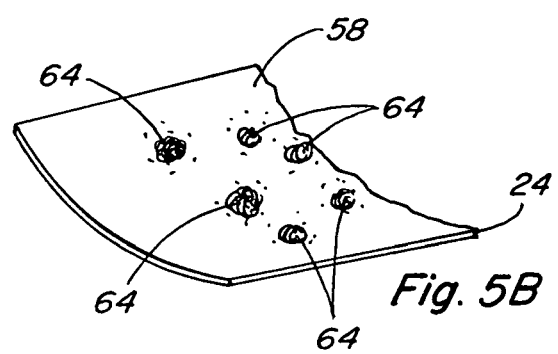
FIG. 5B is another fragmentary perspective representation of a trough element of the invention, including another representative surface texture.

FIG. 5B shows another surface texture for concave surface 58 of trough element 24, which includes more rounded or bulbous weld beads 64. Weld bead 64 can be provided in any desired density, randomly, or in a desired pattern, as desired or required for achieving the desired tumbling and rolling of the tailings. Beads 64 can also be provided at any desired combination with beads 62.

Figure 5C:
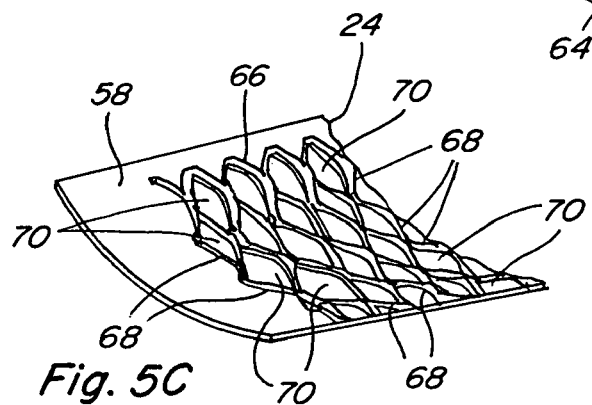
FIG. 5C is another fragmentary perspective representation of a trough element of the invention, including another representative surface texture.
Figure 5D:
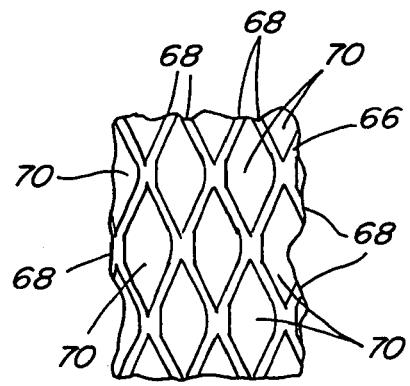
FIG. 5D is another fragmentary perspective representation of a trough element of the invention, including another representative surface texture.
Figure 5E:
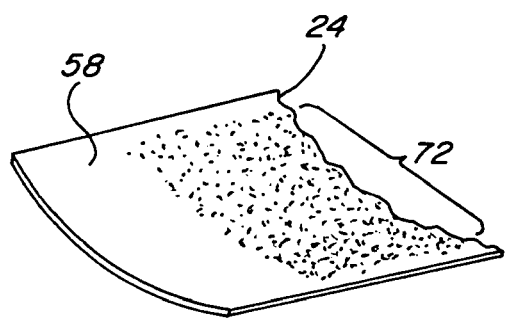
FIG. 5E is another fragmentary perspective representation of a trough element of the invention, including another representative surface texture.
Figure 5F:
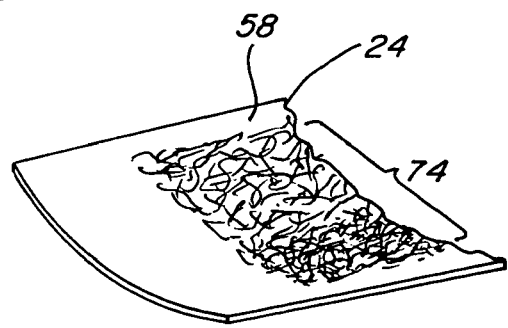
FIG. 5F is another fragmentary perspective representation of a trough element of the invention, including still another representative surface texture.

FIGS. 5C and 5D show another surface texture for concave surface 58 of trough element 24, including a layer or sheet of expanded metal 66 having elongate elements or ribs 68 connected together and extending in a criss-crossing or intersecting pattern, defining a plurality of diamond shaped spaces 70 therebetween. Spaces 70 are upwardly open, yet have bottom portions which are at least substantially enclosed, for instance, by a solid sheet of metal or plastics material, or surface 58, to prevent passage of the tailings therethrough. Importantly, as the tailings are conveyed over ribs 68 and spaces 70, elements of the tailings will be partially received in spaces 70, and then caused to roll and tumble over ribs 68 by forces applied thereagainst by auger 26, as will be illustrated hereinbelow. Expanded metal 66 is also representative of a wide variety of woven and welded screen materials which may be used for achieving the tumbling and rolling effect according to the present invention. FIG. 5E shows still another exemplary surface texture on concave surface 58 of trough element 24, which is a layer of upwardly extending elements 72 welded, adhered, molded in place, or otherwise securely held on surface 58, which elements can include, for instances, abrasive grit of a natural, synthetic or semi-synthetic mineral material, e.g., garnet, aluminum oxide, or plastics material, metal material, or the like, securely held in place, for instance by a binder of a polymer substance or the like, which is sufficiently rough for producing the tumbling and rolling of the tailings sought. FIG. 5F depicts still another exemplary surface texture of raised elements 74 on surface 58 of element 24, which includes randomly disposed and extending elongate elements or strands securely mounted, fixed or molded in surface 58 for providing the desired tumbling and rolling effect.

Figure 6:
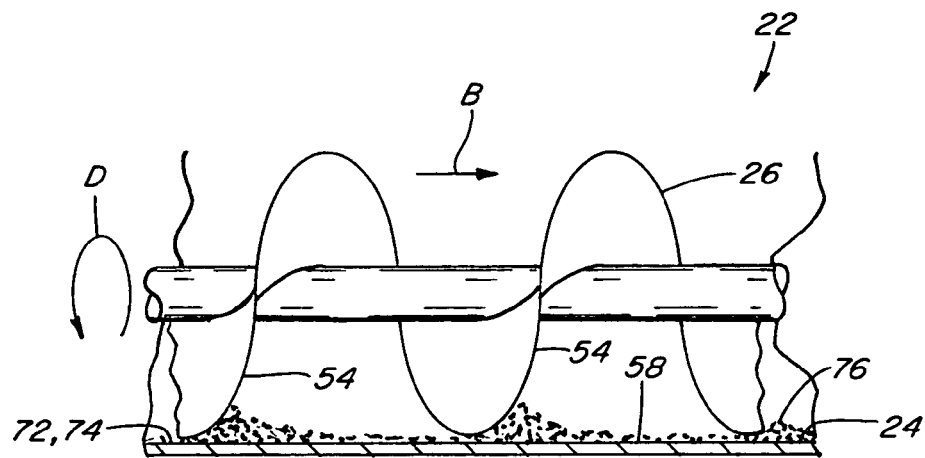
FIG. 6 is a fragmentary side sectional representation of the tailings conveyor and the trough element of the invention, showing tailings being conveyed thereover.

Referring also to FIG. 6, tailings conveyor 22 is illustrated including a textured trough element 24 having a concave surface 58 including raised elements 72 and/or 74 thereon for causing the tumbling and rolling of tailings 76 conveyed thereover in direction B, by the rotation of auger 26, as denoted by arrow D. Generally, in contrast to a smooth surface 58 over which tailings 76 would easily slide, the roughened texture provided by the layer of raised elements 72 and/or 74 results in the bottom most elements of tailings 76 tumbling and rolling thereover such that elements of tailing 76 above the lower most ones are resultingly tumbled, rolled or agitated, which has been found to be adequate to loosen and in many instances release or remove grain held or contained in elements of the tailings, which can include pods and pod fragments in the instance of beans; husks and husk fragments or hulls in the instance of smaller grains and grasses such as wheat and rice; and cob fragments in the instance of corn or maize.

Figure 7:
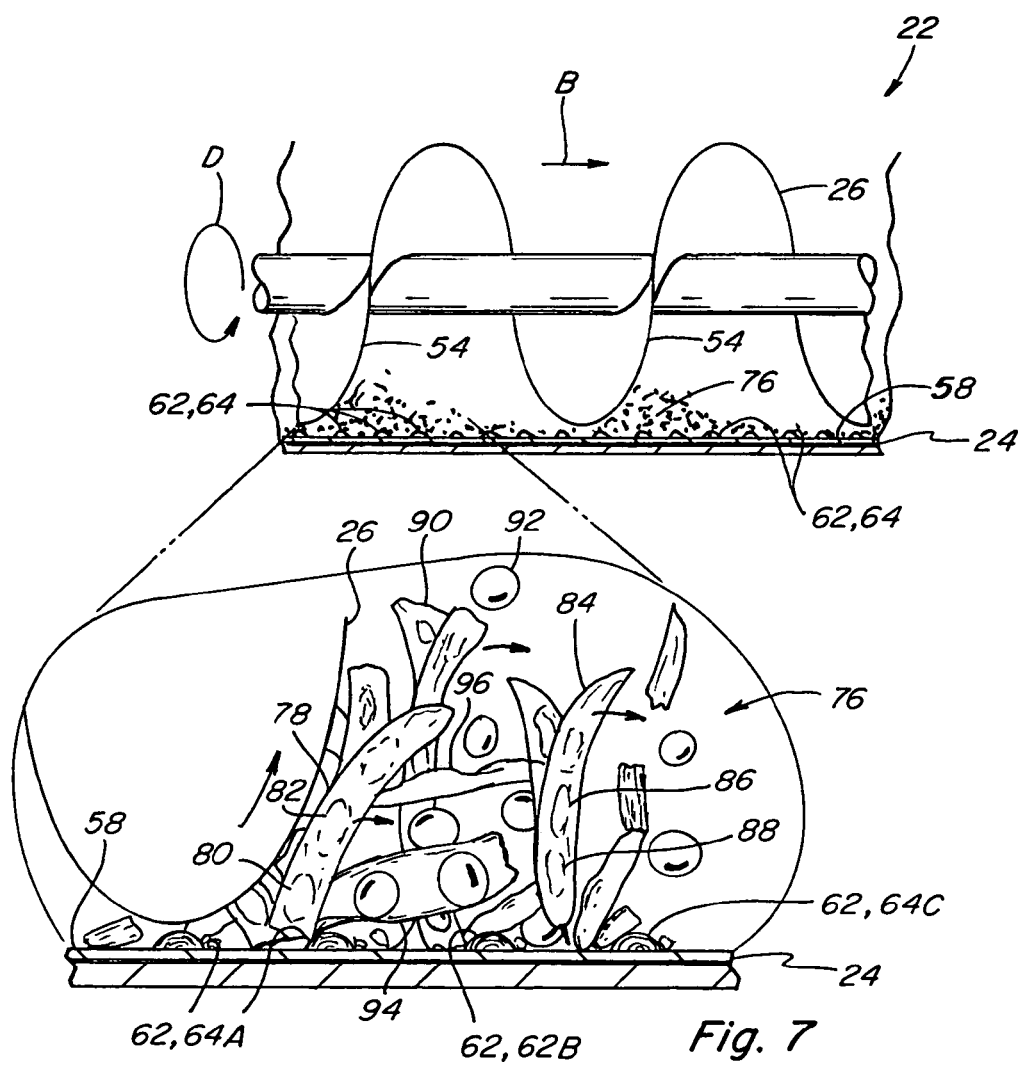
FIG. 7 is another fragmentary side sectional representation of the tailings conveyor including a trough element of the invention, and including a detail of the tailings as they are conveyed thereover.

Here, it should be noted that the raised elements 72 and 74, although extending upwardly from surface 58, will not extend a sufficient distance thereabove so as to contact radial outer periphery 54 of auger 26. This applies also to the other elements that can be used to provide the surface texture 58, including weld beads 62 and 64, and ribs 68 of expanded metal 66. In FIG. 7, beads 62 and/or 64 are illustrated on concave surface 58 of trough element 24 for causing the tumbling and rolling of tailings 76 conveyed thereover in direction B, by rotation of auger 26 of conveyor 22 in direction D.

Figure 8:
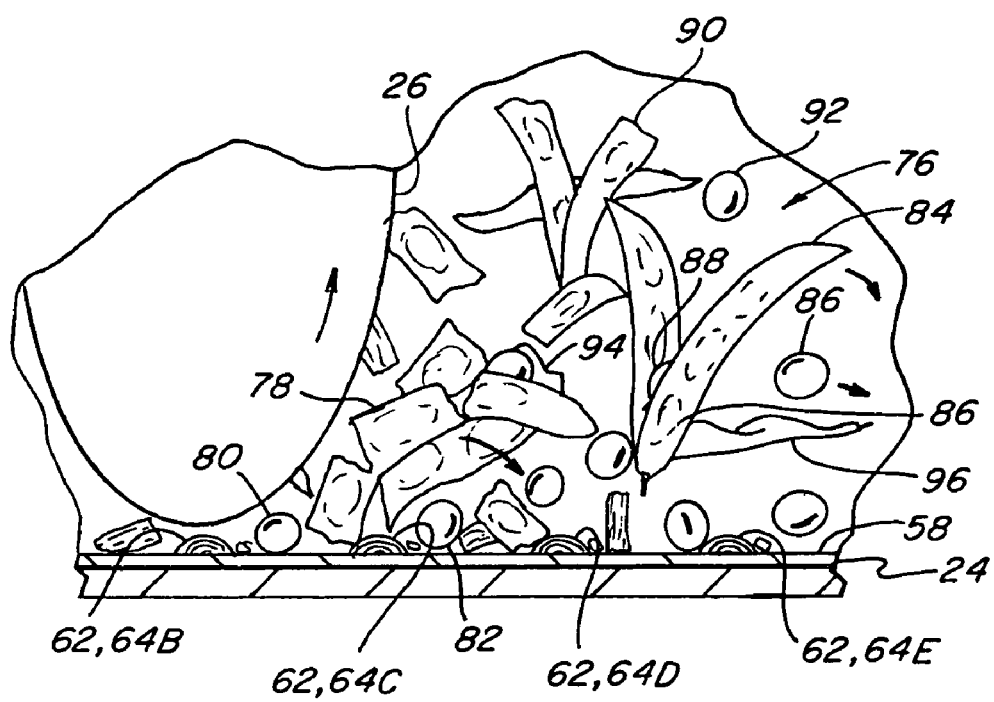
FIG. 8 is an enlarged fragmentary side sectional representation of the conveyor and trough element, showing tumbling and rolling of the tailings compared to the detail of FIG. 7.
Figure 9:
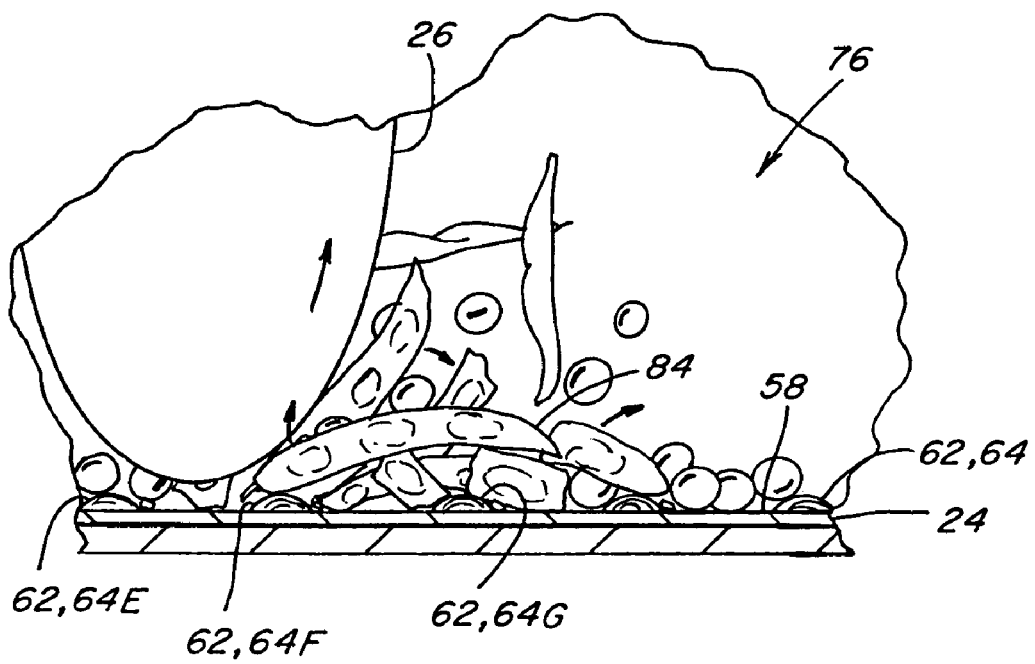
FIG. 9 is an enlarged fragmentary side sectional representation of the conveyor and trough element, showing continued tumbling and rolling of the tailings compared to the detail of FIG. 7 and FIG. 8.

Referring to the enlarged detail of FIG. 7 and to FIGS. 8 and 9, a sequence of tumbling and rolling movements of individually elements of tailings 76 as a result of rotation of auger 26 over a sequence of beads 62, 64A; 62, 64B; 62, 64C; 62, 64D; 62, 64E; 62, 64F; and 62, 64G is illustrated. In the detail of FIG. 7, tailings 76 are shown being conveyed by one flight of auger 26 so as to tumble and roll over beads 62, 64A; 62, 64B; and 62, 64C on concave surface 58 of element 24, as denoted by the small arrows. A bean pod 78 still holding two beans 80 and 82, is of particular interest, as is a second bean pod 84 holding two beans 86 and 88. Another pod 90 is shown beside a bean 92 just released therefrom, and additional pods 94 and 96 are also shown.

In FIG. 8, tailings 76 are shown tumbling and rolling over beads 62, 64B; 62, 64C; 62, 64D; and 62, 64E, again as denoted by the small arrows. Bean pod 78 is illustrated as having tumbled and rolled sufficiently so as to be torn into three fragments, releasing beans 80 and 82. Bean pod 84 has been split open to release beans 86 and 88. Pod 90 has also been split to release another bean therefrom. Pods 94 and 96 are shown rotated and tumbled to new orientations.

In FIG. 9, tailings 76 have been conveyed to beads 62, 64E; 62, 64F; and 62, 64G. Pod 84 is now tumbled even more, and a greater number of released beans are evident.

Figure 10:
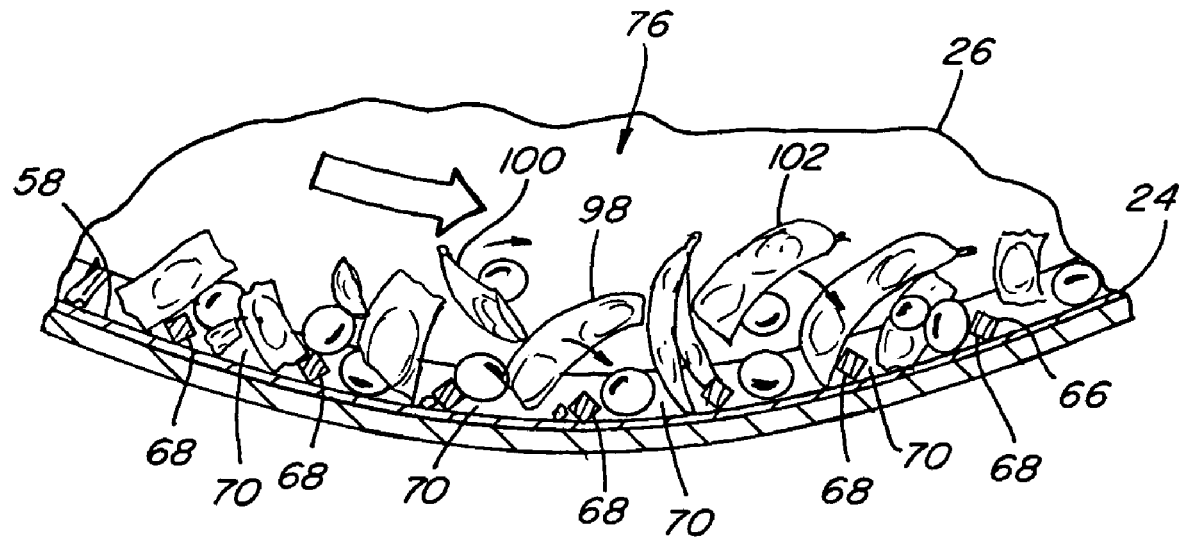
FIG. 10 is an enlarged fragmentary end view of the conveyor showing another trough element of the invention, and illustrating tumbling and rolling of tailings conveyed thereover.
Figure 11:
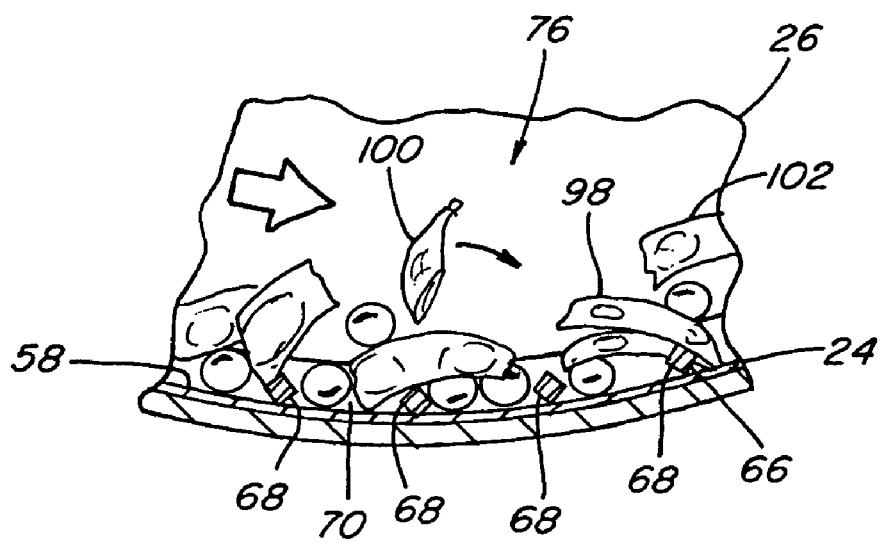
FIG. 11 is still another enlarged fragmentary end view of the conveyor showing another trough element of the invention, and illustrating tumbling and rolling of tailings conveyed thereover compared to FIG. 10.

Turning to FIGS. 10 and 11, textured trough element 24 is shown including a layer of expanded metal 66 for providing the rough texture of the invention, expanded metal layer 66 including ribs 68 defining upwardly open spaces 70 therebetween enclosed at the bottom by a metal or plastics sheet comprising concave surface 58. FIGS. 10 and 11 are longitudinal end views, such that auger 26 will rotate to the right, as denoted by the large arrows. Exemplary pods 98, 100 and 102 are shown variously entering spaces 70, contacting ribs 68 and tumbling and/or rolling thereover toward the right hand side of the drawing, to illustrate effects of the present invention.

Referring again to FIGS. 3 and 4, trough element 24 can be positioned in trough 28, or can comprise all or most of trough 28, as desired or required for a particular application. For instance, trough element 24 can comprise a concave liner which lies in, or is applied to, trough 28. Alternatively, trough 28 can include a downwardly facing opening such as elongate opening 104 shown in FIG. 4, and trough element 24 can comprise a bottom door or cover on an inner surface of which concave surface 58 is located, and which is securable in closing relation to opening 104. In this regard, trough element 24 can include, for example, one or more outer peripheral flanges or lips or other elements 106 which engage and/or contact a peripheral edge of trough 28 adjacent to opening 104, for enclosing opening 104. Trough element 24 can then be held in such position by suitable elements, such as a hook 108 and loop 110 on one side, and an over center clamp on the opposite side, to allow easy and fast removal and replacement. Here, it should be recognized that trough element can be held in position using a wide variety of other commercially available elements.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A textured trough element for a trough of a tailings conveyor for an agricultural combine, the conveyor including a rotary auger in the trough and rotatable about an axis therethrough, the auger having a helical radial outer periphery having a circular shape profile when viewed from an axial end thereof, the textured trough element comprising:
   a concave surface having a curved profile when viewed from a longitudinal end thereof of marginally larger diametrical extent than the circular cross section of the auger, the trough element being positionable in a bottom portion of the trough with the concave surface facing and extending partially around a bottom portion of the helical radial outer periphery of the auger such that the auger will convey the tailings on and along the concave surface, and the concave surface having a sufficiently rough surface texture substantially covering the concave surface in the longitudinal direction for causing tumbling and rolling of at least a substantial portion of the tailings conveyed thereover for loosening and releasing at least some of any grain partially or fully contained in elements of the tailings, wherein the surface texture is in continuous contact with the concave surface along the longitudinal direction, such that the surface texture has a curved profile concentric with the concave surface and that the surface texture is a substantially planar layer when viewed from the longitudinal end thereof.

2. The trough element of claim 1, wherein the concave surface comprises a plurality of upwardly extending elements welded to the surface.

3. The trough element of claim 1, wherein the concave surface comprises a sheet having a plurality of spaced, elements extending upwardly therefrom.

4. The trough element claim 3, wherein the sheet is metal.

5. The trough of claim 3, wherein the sheet is plastics.

6. The trough of claim 1, wherein the concave surface comprises an array of ribs having spaces therebetween, the spaces having bottom portions which are enclosed for preventing passage of tailings downwardly therethrough, the spaces being sufficiently large for receiving portions of elements of the tailings as the tailings are conveyed thereover by the auger, and such that at least a substantial portion of the elements of the tailings received in the spaces will roll when conveyed from the spaces over an adjacent one of the ribs.

7. The trough element of claim 6, wherein the concave surface comprises an expanded metal sheet over a solid sheet.

8. The trough element of claim 1, wherein the concave surface comprises a layer of upwardly extending grains having randomly facing surfaces and edges which will cause the tailings to tumble and roll when conveyed thereover.

9. The trough element of claim 1, wherein the bottom portion of the trough has an opening therein, and the trough element is configured to enclose the opening.

10. The trough element of claim 9, wherein the concave surface is configured to at least substantially occupy the opening in the bottom portion of the trough and the trough element further comprises at least one flange or lip located adjacent to the concave surface in position to contact a surface of the trough adjacent to the opening, for holding the trough element in the position in the trough with the concave surface located radially outwardly of and extending partially around the bottom portion of the helical radial outer periphery of the auger such that the auger will convey the tailings along the concave surface.

11. In a tailings conveyor for an agricultural combine, including a housing containing an elongate helical auger rotatable about an axis therethrough and having a radial outer portion which circumscribes an arc when the auger is rotated, an improvement comprising:
   a trough element configured to be positioned in the housing beneath the auger, the trough element having a concave surface disposed to face upwardly and extend at least partially around a lower portion of the radial outer portion of the auger in adjacent relation thereto, the concave surface having a texture substantially covering the concave surface in the longitudinal direction for causing agitation of the tailings conveyed thereover sufficient for removing at least some of any grain of the tailings from other elements of the tailings containing the grain, wherein the texture is in continuous contact with the concave surface along the longitudinal direction, such that the texture has a curved profile concentric with the concave surface and that the texture is a substantially planar layer when viewed from a longitudinal end thereof.

12. In the tailings conveyor of claim 11, the concave surface of the improvement comprising a plurality of raised weld beads.

13. In the tailings conveyor of claim 11, the concave surface of the improvement comprising a plurality of raised protuberances, each of the protuberances having surfaces facing in a plurality of directions for causing the agitation of the tailings conveyed thereover.

14. In the tailings conveyor of claim 11, the concave surface of the improvement comprising an expanded metal sheet for causing the agitation of the tailings conveyed thereover.

15. In the tailings conveyor of claim 11, the concave surface of the improvement comprising a layer of raised weld splatter for causing the agitation of the tailings conveyed thereover.

16. In the tailings conveyor of claim 11, the concave surface of the improvement comprising a layer of abrasive grains retained in a binder and having randomly facing surfaces and edges for agitating the tailings in a random manner.

17. In the tailings conveyor of claim 16, the binder of the improvement comprising a polymer.

18. In the tailings conveyor of claim 11, the housing comprising a trough, and the improvement further an opening in a bottom portion of the trough and the trough element being configured to enclose the opening.

19. In the tailings conveyor of claim 18, the improvement further comprising the concave surface being configured to at least substantially occupy the opening in the bottom portion of the trough and the trough element further comprising at least one flange or lip located adjacent to the concave surface in position to contact a surface of the trough adjacent to the opening, for holding the trough element in the position in the trough with the concave surface located radially outwardly of and extending partially around the bottom portion of the helical radial outer periphery of the auger such that the auger will convey the tailings along the concave surface.

20. A trough element for a tailings conveyor for an agricultural combine, the conveyor including a trough containing an auger rotatable about an axis therethrough and having a helical radial outer periphery having a circular shape profile when viewed from an axial end thereof, the trough element comprising:
   a concave surface having a curved profile when viewed from a longitudinal end thereof of marginally larger diametrical extent than the circular cross section of the auger, the concave surface having a texture substantially covering the concave surface in the longitudinal direction, the trough element being positionable in the trough with the textured concave surface located radially outwardly of and below the helical radial outer periphery of the auger such that the auger will convey the tailings over the textured concave surface, and the texture of the concave surface being configured for causing tumbling movement of at least a substantial portion of tailings that contact the surface and tailings adjacent thereto for removing at least some of any grain of the tailings from elements of the tailings containing the grain, wherein the texture is in continuous contact with the concave surface along the longitudinal direction, such that the texture has a curved profile concentric with the concave surface and that the texture is a substantially planar layer when viewed from the longitudinal end thereof.

21. The trough element of claim 20, wherein the concave surface comprises a plurality of raised weld beads.

22. The trough element of claim 20, wherein the concave surface comprises a plurality of raised protuberances, each of the protuberances having surfaces facing in a plurality of directions for causing the tumbling of the tailings.

23. The trough element of claim 20, wherein the concave surface comprises an expanded metal sheet for causing the tumbling of the tailings.

24. The trough element of claim 20, wherein the concave surface comprises a layer of raised weld splatter for causing the tumbling of the tailings.

25. The trough element of claim 20, wherein the texture of the concave surface is provided by a layer of abrasive grains retained in a binder and having randomly facing surfaces and edges for causing the tailings to tumble in a random manner thereover.

26. The trough element of claim 25, wherein the binder comprises a polymer.

27. The trough element of claim 20, further comprising elements for removably supporting the trough element in the position in the trough.

28. The trough element of claim 25, comprising a bottom enclosure for the trough.

29. The trough element of claim 28, wherein the concave surface is configured to occupy an opening in the bottom of the trough and the trough element further comprises at least one flange or lip adjacent to the concave surface in position to contact a surface of the trough adjacent to the opening.

30. A tailings conveyor for an agricultural combine, comprising;
   a housing containing an elongate helical auger rotatable about an axis therethrough and having a radial outer portion which circumscribes an arc when the auger is rotated; and
   a trough element removably positioned in the housing beneath the auger, the trough element having a concave surface which faces upwardly and extends at least partially around a lower portion of the radial outer portion of the auger in adjacent relation thereto, the concave surface having a texture substantially covering the concave surface in the longitudinal direction for causing tumbling and rolling of the tailings conveyed thereover sufficient for removing at least some of any grain of the tailings from other elements of the tailings containing the grain, wherein the texture is in continuous contact with the concave surface along the longitudinal direction, such that the texture has a curved profile concentric with the concave surface and that the texture is a substantially planar layer when viewed from a longitudinal end thereof.

31. The tailings conveyor of claim 30, wherein the concave surface comprises a plurality of raised weld beads.

32. The tailings conveyor of claim 30, wherein the concave surface comprises a plurality of raised protuberances, each of the protuberances having surfaces facing in a plurality of directions for causing the tumbling and rolling of the tailings conveyed thereover.

33. The tailings conveyor of claim 30, wherein the concave surface comprises an expanded metal sheet for causing the tumbling and rolling of the tailings conveyed thereover.

34. The tailings conveyor of claim 30, wherein the concave surface comprises a layer of raised weld splatter for causing the tumbling and rolling of the tailings conveyed thereover.

35. The tailings conveyor of claim 30, wherein the concave surface comprises a layer of abrasive grains retained in a binder and having randomly facing surfaces and edges for tumbling and rolling the railings in a random manner.

36. The tailings conveyor of claim 35, wherein the binder comprises a plastics material.

37. Threshing apparatus for a tailings conveyor of an agricultural combine, comprising:

a first tailings conveyor including a housing including an inlet opening for receiving tailings from a cleaning system of the combine, the housing containing an elongate helical auger rotatable about an axis therethrough for conveying the tailings through the housing and from the housing through an outlet opening thereof, the auger having a radial outer portion which circumscribes an arc when the auger is rotated, and a trough element positioned in the housing beneath the auger, the trough element having a concave surface disposed to face upwardly toward the auger in adjacent relation to a bottom portion of the radial outer portion thereof, the concave surface having a sufficiently rough texture substantially covering the concave surface in the longitudinal direction for causing agitation of the tailings conveyed thereover sufficient for loosening and releasing at least some of any grain of the tailings from other elements of the tailings holding the grain, wherein the texture is in continuous contact with the concave surface along the longitudinal direction, such that the texture has a curved profile concentric with the concave surface and that the texture is a substantially planar layer when viewed from a longitudinal end thereof; and a second tailings conveyor including a second housing having an inlet opening positioned for receiving the tailings from the first tailings conveyor, and at least one impeller mounted for rotation in the second housing, the at least one impeller when rotated causing the tailings to be deflected off of at least one interior surface of the second housing in a turbulent manner so as to be at least partially threshed thereby.

\* \* \* \* \*